United States Patent
Ishizuka et al.

(10) Patent No.: US 10,957,487 B2
(45) Date of Patent: Mar. 23, 2021

(54) MULTILAYER CERAMIC CAPACITOR

(71) Applicant: Murata Manufacturing Co., Ltd., Nagaokakyo (JP)

(72) Inventors: Akira Ishizuka, Nagaokakyo (JP); Hiroyuki Hirano, Nagaokakyo (JP); Takatoshi Sueto, Nagaokakyo (JP); Masatoshi Yanagihara, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 12 days.

(21) Appl. No.: 16/676,525

(22) Filed: Nov. 7, 2019

(65) Prior Publication Data
US 2020/0152385 A1    May 14, 2020

(30) Foreign Application Priority Data
Nov. 9, 2018  (JP) .............................. JP2018-211562

(51) Int. Cl.
*H01G 4/232* (2006.01)
*H01G 4/30* (2006.01)
*H01G 4/12* (2006.01)

(52) U.S. Cl.
CPC .......... *H01G 4/232* (2013.01); *H01G 4/1209* (2013.01); *H01G 4/30* (2013.01)

(58) Field of Classification Search
CPC ......... H01G 4/232; H01G 4/30; H01G 4/1209
See application file for complete search history.

(56) References Cited

U.S. PATENT DOCUMENTS

| | | | | |
|---|---|---|---|---|
| 7,319,582 B2 * | 1/2008 | Takashima | ............... | H01G 4/12 29/25.42 |
| 8,649,155 B2 * | 2/2014 | Sasaki | ...................... | H01G 4/30 361/303 |
| 8,687,344 B2 * | 4/2014 | Akazawa | ............... | H01G 4/005 361/303 |
| 10,008,332 B2 * | 6/2018 | Mizuno | .................. | H01G 4/232 |

(Continued)

FOREIGN PATENT DOCUMENTS

| | | |
|---|---|---|
| JP | 2001-155959 A | 6/2001 |
| JP | 2004-111489 A | 4/2004 |

(Continued)

*Primary Examiner* — Nathan Milakovich
(74) *Attorney, Agent, or Firm* — Keating & Bennett, LLP

(57) ABSTRACT

A multilayer ceramic capacitor includes a laminated body including dielectric layers and internal electrodes alternately laminated, and an external electrode provided on the surface of the laminated body and connected to the internal electrodes. The internal electrode includes a facing electrode portion facing another internal electrode with the dielectric layer provided therebetween, and an extended electrode portion extended from the facing electrode portion to the surface of the laminated body and connected to the external electrode. At least one layer of the internal electrodes includes a bent portion in the extended electrode portion. The distance between extended electrode portions adjacent to each other in the lamination direction narrows from the end portion of the facing electrode portion toward the bent portion, and widens from the bent portion toward the end portion of the extended electrode portion on the external electrode side.

17 Claims, 6 Drawing Sheets

(56) References Cited

U.S. PATENT DOCUMENTS

| | | | | |
|---|---|---|---|---|
| 10,347,421 B2* | 7/2019 | Chung | ............... | H01G 4/005 |
| 2015/0116902 A1 | 4/2015 | Sakai | | |
| 2016/0233024 A1* | 8/2016 | Kim | ............... | H01G 4/012 |
| 2018/0190433 A1 | 7/2018 | Cho et al. | | |
| 2020/0066453 A1* | 2/2020 | Jeong | ............... | H01G 4/012 |
| 2020/0152381 A1* | 5/2020 | Matsushita | ............... | H01G 4/30 |
| 2020/0152388 A1* | 5/2020 | Jun | ............... | H01G 4/224 |

FOREIGN PATENT DOCUMENTS

| | | | |
|---|---|---|---|
| JP | 2015-111650 A | | 6/2015 |
| JP | 2015159140 A | * | 9/2015 |
| JP | 2018-110212 A | | 7/2018 |

* cited by examiner

MULTILAYER CERAMIC CAPACITOR

CROSS REFERENCE TO RELATED APPLICATIONS

This application claims the benefit of priority to Japanese Patent Application No. 2018-211562 filed on Nov. 9, 2018. The entire contents of this application are hereby incorporated herein by reference.

BACKGROUND OF THE INVENTION

1. Field of the Invention

The present invention relates to a multilayer ceramic capacitor.

2. Description of the Related Art

As an example of a multilayer ceramic capacitor, Japanese Patent Application Laid-Open No. 2018-110212 discloses a capacitor component including a laminated structure of a plurality of dielectric layers, the laminated structure including a first surface and a second surface facing each other, a main body alternatingly disposed with the plurality of dielectric layers therebetween, and including first and second internal electrodes exposed at the first surface and the second surface, a metal layer covering the first surface and the second surface and connected to the first and second internal electrodes, a ceramic layer covering the metal layer, and first and second external electrodes covering the ceramic layer and connected to the metal layer to electrically connected to the first and second internal electrodes.

According to Japanese Patent Application Laid-Open No. 2018-110212, by covering the surface of the main body with a metal layer and a ceramic layer, it is possible to suppress the infiltration of moisture from the outside, thereby improving the moisture resistance reliability.

However, in the structure described in Japanese Patent Application Laid-Open No. 2018-110212, since it is necessary to add additional components, such as a metal layer and a ceramic layer, there is a concern about a decrease in productivity and an increase in cost.

SUMMARY OF THE INVENTION

Preferred embodiments of the present invention provide multilayer ceramic capacitors that are each able to significantly improve the moisture resistance reliability without adding an additional component.

A multilayer ceramic capacitor according to a preferred embodiment of the present invention includes a laminated body including a plurality of dielectric layers and a plurality of internal electrodes alternately laminated, and including a first main surface and a second main surface facing each other in a lamination direction, a first end surface and a second end surface facing each other in a length direction orthogonal or substantially orthogonal to the lamination direction, and a first side surface and a second side surface facing each other in a width direction orthogonal or substantially orthogonal to the lamination direction and the length direction, and an external electrode provided on a surface of the laminated body and connected to the internal electrode. The internal electrode includes a facing electrode portion facing another internal electrode with the dielectric layer provided therebetween, and an extended electrode portion extended from the facing electrode portion to the surface of the laminated body and connected to the external electrode. At least one layer of the internal electrode includes a bent portion in the extended electrode portion. The distance between extended electrode portions adjacent to each other in the lamination direction narrows from the end portion of the facing electrode portion toward the bent portion, and widens from the bent portion toward the end portion of the extended electrode portion on the external electrode side.

Preferred embodiments of the present invention provide multilayer ceramic capacitors that are each able to significantly improve moisture resistance reliability without adding an additional component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention will be described in detail with reference to the drawings.

The present invention is not limited to the following configurations of preferred embodiments, but can be applied by appropriately changing the configurations within a range not changing the gist of the present invention. Note that a combination of two or more individual configurations of preferred embodiments described below is also within the scope of the present invention.

As a preferred embodiment of the multilayer ceramic capacitor of the present invention, a three-terminal multilayer ceramic capacitor will be described as an example. The present invention can also be applied to multilayer ceramic capacitors other than the three-terminal multilayer ceramic capacitor. For example, a two-terminal multilayer ceramic capacitor, a multi-terminal multilayer ceramic capacitor, etc. may be applicable. Further, the multilayer ceramic capacitors according to preferred embodiments of the present invention may be a multilayer ceramic capacitor including a via electrode, a multilayer ceramic capacitor including a bottom surface electrode, or the like, for example.

Figure 1:
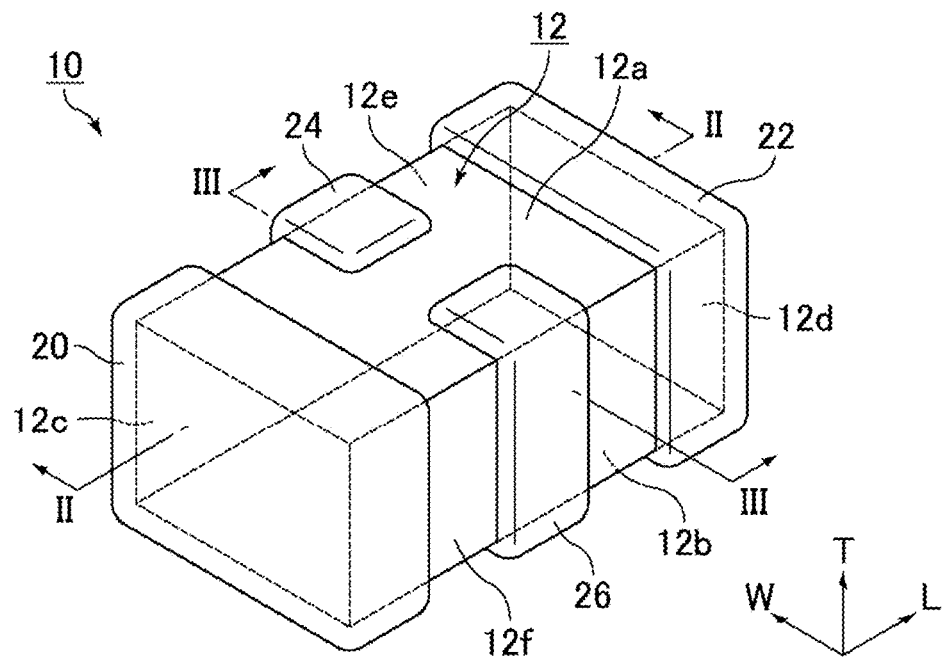
FIG. 1 is a perspective view showing an example of a multilayer ceramic capacitor according to a preferred embodiment of the present invention.
Figure 2:
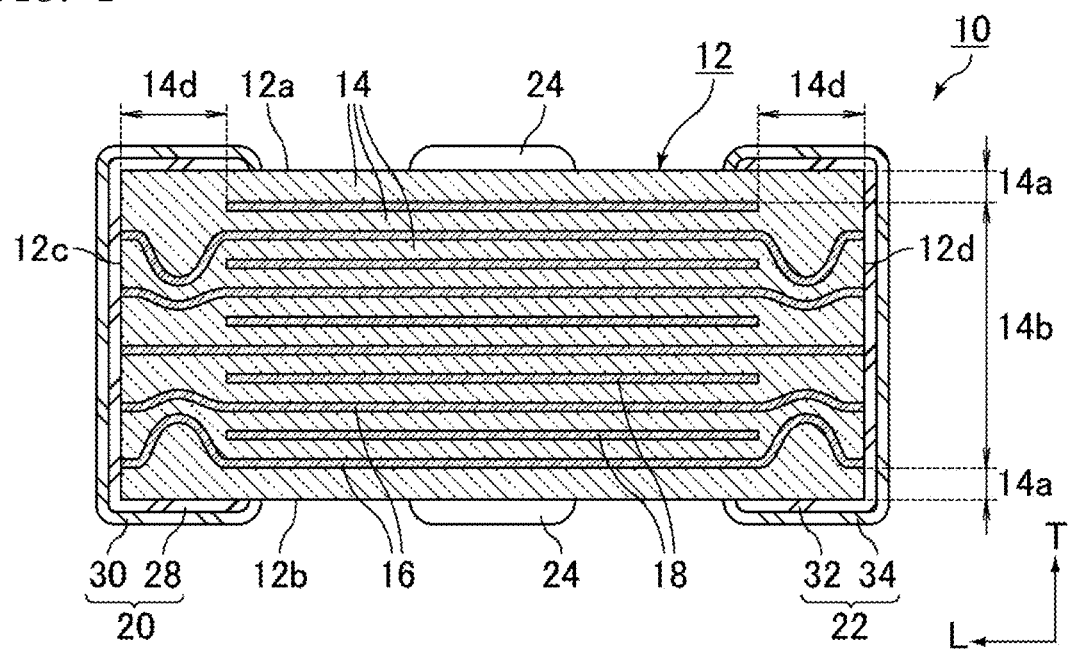
FIG. 2 is a cross-sectional view of the multilayer ceramic capacitor taken along line II-II of FIG. 1.
Figure 3:
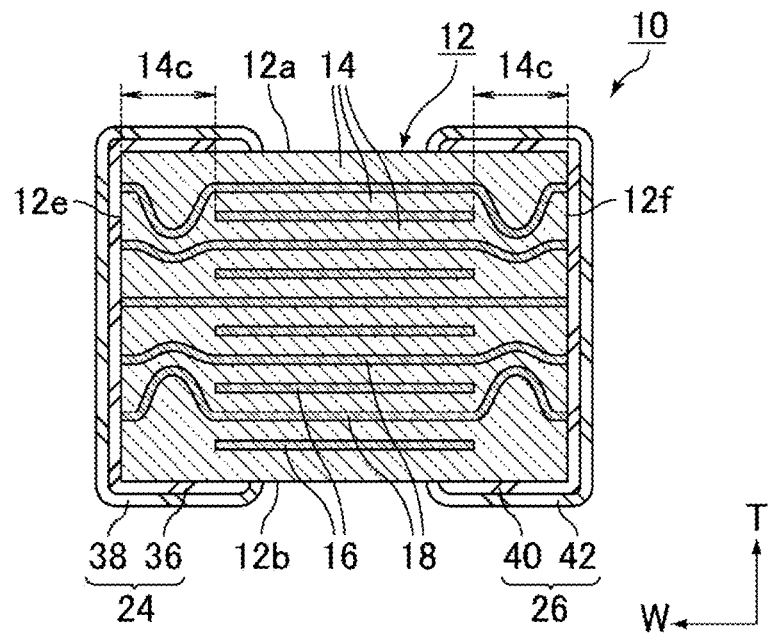
FIG. 3 is a cross-sectional view of the multilayer ceramic capacitor taken along line III-III of FIG. 1.

FIG. 1 is a perspective view showing an example of the multilayer ceramic capacitor according to a preferred embodiment of the present invention. FIG. 2 is a cross-sectional view of the multilayer ceramic capacitor taken along line II-II of FIG. 1. FIG. 3 is a cross-sectional view of the multilayer ceramic capacitor taken along line III-III of FIG. 1.

In this specification, the lamination direction, the length direction, and the width direction of the multilayer ceramic capacitor and the laminated body are respectively defined by T, L, and W in FIG. 1. Here, the lamination direction (T direction), the length direction (L direction), and the width direction (W direction) are orthogonal or substantially orthogonal to each other. The lamination direction (T direction) is a direction in which a plurality of dielectric layers 14 and a plurality of internal electrodes 16 and 18 are laminated.

A multilayer ceramic capacitor 10 in FIGS. 1, 2 and 3 is preferably a three-terminal multilayer ceramic capacitor, for example. As shown in FIG. 1, FIG. 2 and FIG. 3, the multilayer ceramic capacitor 10 includes, for example, a rectangular parallelepiped or a substantially rectangular parallelepiped laminated body 12.

The laminated body 12 includes the plurality of dielectric layers 14 and the plurality of internal electrodes 16 and 18 alternately laminated.

The laminated body 12 includes a first main surface 12a and a second main surface 12b facing each other in the lamination direction (T direction), a first end surface 12c and a second end surface 12d facing each other in the length direction (L direction) orthogonal or substantially orthogonal to the lamination direction (T direction), and a first side surface 12e and a second side surface 12f facing each other in the width direction (W direction) orthogonal or substantially orthogonal to the lamination direction (T direction) and the length direction (L direction).

In the present specification, a cross section of the multilayer ceramic capacitor 10 or the laminated body 12 orthogonal or substantially orthogonal to the first end surface 12c and the second end surface 12d, and parallel or substantially parallel to the lamination direction (T direction) is referred to as an LT cross section. Further, a cross section of the multilayer ceramic capacitor 10 or the laminated body 12 orthogonal or substantially orthogonal to the first side surface 12e and the second side surface 12f, and parallel or substantially parallel to the lamination direction (T direction) is referred to as a WT cross section. Further, a cross section of the multilayer ceramic capacitor 10 or the laminated body 12 orthogonal or substantially orthogonal to the first end surface 12c, the second end surface 12d, the first side surface 12e, and the second side surface 12f, and orthogonal or substantially orthogonal to the lamination direction (T direction) is referred to as an LW cross section. Therefore, FIG. 2 is the LT cross section of the multilayer ceramic capacitor 10, and FIG. 3 is the WT cross section of the multilayer ceramic capacitor 10.

The laminated body 12 preferably, for example, has rounded corner portions and ridgeline portions. The corner portions are portions at which the three surfaces of the laminated body intersect, and the ridgeline portions are portions at which the two surfaces of the laminated body intersect.

In the multilayer ceramic capacitor 10 shown in FIG. 1, the dimension of the laminated body 12 in the length direction (L direction) is longer than the dimension of the laminated body 12 in the width direction (W direction). However, the dimension of the laminated body 12 in the length direction may be shorter than the dimension of the laminated body 12 in the width direction, or may be the same as the dimension in the width direction.

The dielectric layer 14 is made of a dielectric material. An example of the dielectric material preferably includes a dielectric ceramic including a main component, for example, barium titanate, calcium titanate, strontium titanate, barium calcium titanate, or calcium zirconate. When the above dielectric material is included as a main component, depending on the desired characteristics of the multilayer ceramic capacitor 10, for example, the dielectric ceramic in which an auxiliary component, for example, an Mg compound, an Mn compound, an Si compound, an Al compound, a V compound, an Ni compound or a rare earth compound is added, where the content of the auxiliary component is less than that of the main components, is used.

The average thickness of the dielectric layer 14 sandwiched between the internal electrodes is preferably about 0.3 μm or more and about 30 μm or less, for example.

As shown in FIG. 2, the dielectric layer 14 includes an outer layer portion 14a and an inner layer portion 14b. The outer layer portion 14a is the dielectric layer 14 which is located on the first main surface 12a side of the laminated body 12 and located between the first main surface 12a and the internal electrode (the internal electrode 18 in FIG. 2) closest to the first main surface 12a, and is the dielectric layer 14 which located on the second main surface 12b side of the laminated body and located between the second main surface 12b and the internal electrode (the internal electrode 16 in FIG. 2) closest to the second main surface 12b. The region located between both outer layer portions 14a is the inner layer portion 14b.

The thickness of the outer layer portion 14a is preferably about 5 μm or more and about 100 μm or less on one side, for example.

The dimension of the length direction (L direction) of the laminated body 12 is preferably about 0.15 mm or more and about 6.4 mm or less, for example. The dimension of the width direction (W direction) of the laminated body 12 is preferably about 0.15 mm or more and about 3.2 mm or less, for example. The dimension of the lamination direction (T direction) of the laminated body 12 is preferably about 0.04 mm or more and about 3.2 mm or less, for example.

A first end surface external electrode 20, which is an example of the first external electrode, is provided on the first end surface 12c of the laminated body 12. The first end surface external electrode 20 preferably extends from the first end surface 12c of the laminated body 12 to cover a portion of the first main surface 12a, a portion of the second main surface 12b, a portion of the first side surface 12e, and a portion of the second side surface 12f, for example.

A second end surface external electrode 22, which is an example of a second external electrode, is provided on the second end surface 12d of the laminated body 12. The second end surface external electrode 22 preferably extends from the second end surface 12d of the laminated body 12 to cover a portion of the first main surface 12a, a portion of the second main surface 12b, a portion of the first side surface 12e, and a portion of the second side surface 12f, for example.

A first side surface external electrode 24, which is an example of a third external electrode, is provided on the first side surface 12e of the laminated body 12. The first side surface external electrode 24 extends from the first side surface 12e to cover a portion of the first main surface 12a and a portion of the second main surface 12b. The first side surface external electrode 24 may be provided only on the first side surface 12e.

A second side surface external electrode 26, which is an example of the fourth external electrode, is provided on the second side surface 12f of the laminated body 12. The second side surface external electrode 26 extends from the second side surface 12f and to cover a portion of the first main surface 12a and a portion of the second main surface 12b. The second side surface external electrode 26 may be provided only on the second side surface 12f.

In addition, the first side surface external electrode 24 may extend from the first side surface 12e to the second side surface external electrode 26 to cover the first main surface 12a, and furthermore, the first side surface external electrode 24 may extend from the first side surface 12e to the second side surface external electrode 26 to cover the second main surface 12b, so that the first side surface external electrode 24 and the second side surface external electrode 26 may be connected. As a result of the connection, the first side surface external electrode 24 may wind around a portion of the laminated body 12.

As shown in FIG. 2, the first end surface external electrode 20 includes, sequentially from the laminated body 12 side, a base electrode layer 28 provided on the surface of the laminated body 12 and a plating layer 30 to cover the base electrode layer 28. Similarly, the second end surface external electrode 22 includes, sequentially from the laminated body 12 side, a base electrode layer 32 provided on the surface of the laminated body 12 and a plating layer 34 to cover the base electrode layer 32.

As shown in FIG. 3, the first side surface external electrode 24 includes, sequentially from the laminated body 12 side, a base electrode layer 36 provided on the surface of the laminated body 12 and a plating layer 38 to cover the base electrode layer 36. Similarly, the second side surface external electrode 26 includes, sequentially from the laminated body 12 side, a base electrode layer 40 provided on the surface of the laminated body 12 and a plating layer 42 to cover the base electrode layer 40.

The base electrode layer includes at least one selected from a baked electrode layer, a resin electrode layer, a thin film electrode layer, and the like.

The baked electrode layer includes metal and may include glass and ceramic. As the metal of the baked electrode layer, for example, at least one selected from Cu, Ni, Ag, Pd, an Ag—Pd alloy, Au and the like can preferably be used. As glass of a baked electrode layer, glass including B, Si, Ba, Mg, Al or Li etc. can preferably be used, for example.

The baked electrode layer may include a plurality of layers.

The baked electrode layer is obtained by applying a conductive paste including metal and glass to the laminated body and baking it. The baked electrode layer may be co-fired with the laminated body, or may be baked after firing the laminated body. When co-firing with the laminated body to form a baked electrode layer, the baked electrode layer preferably includes metal and ceramic, for example. More preferably, the ceramic is a common material, for example.

When the base electrode layer is a baked electrode layer, the thickness of the baked electrode layer is preferably about 1 μm or more and about 100 μm or less at the thickest portion, for example.

As a material of the plating layer, for example, at least one selected from Cu, Ni, Ag, Pd, an Ag—Pd alloy, Au, Sn and the like is preferably used.

The plating layer may include a plurality of layers. The plating layer is preferably a two-layer structure of a Ni plating layer and a Sn plating layer, for example. The Ni plating layer is able to significantly reduce or prevent erosion of the base electrode layer by the solder when the multilayer ceramic capacitor is mounted. The Sn plating layer can significantly improve wettability of the solder when the multilayer ceramic capacitor is mounted, and can facilitate the mounting of the multilayer ceramic capacitor.

The average thickness of the Ni plating layer is preferably between about 1 μm to about 10 μm (inclusive), for example. The average thickness of the Sn plating layer is preferably between about 1 μm to about 10 μm (inclusive), for example.

As shown in FIGS. 2 and 3, the laminated body 12 includes a plurality of first internal electrodes 16 and a plurality of second internal electrodes 18. The plurality of first internal electrodes 16 and the plurality of second internal electrodes 18 are embedded alternately at equal or substantially equal intervals along the lamination direction (T direction) of the laminated body 12.

Figure 4A:
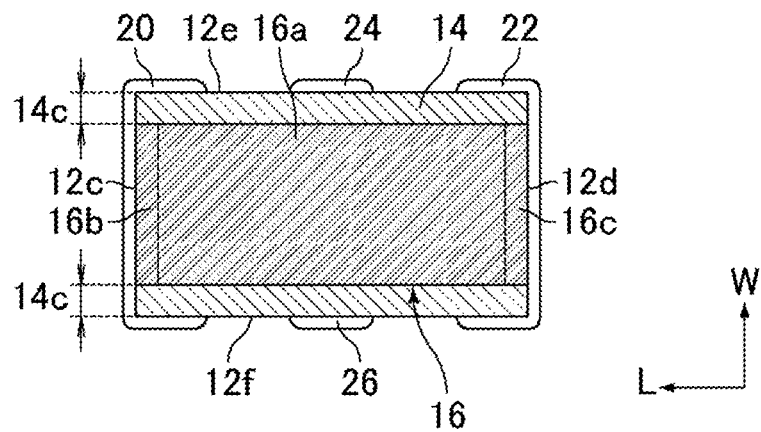
FIG. 4A is a plan view showing an example of a first internal electrode.
Figure 4B:
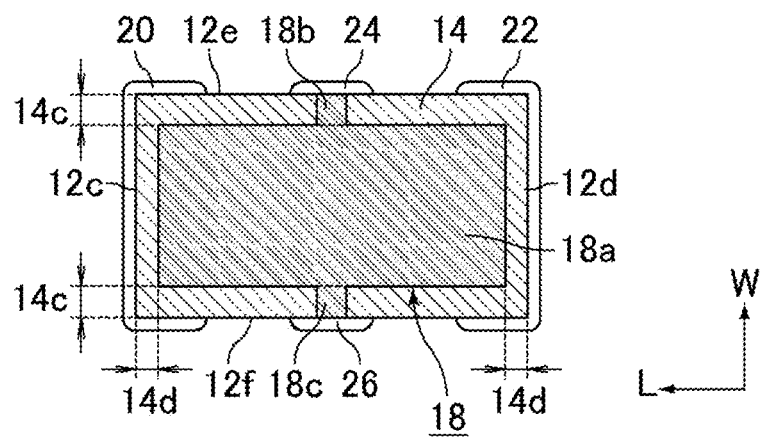
FIG. 4B is a plan view showing an example of a second internal electrode.

FIG. 4A is a plan view showing an example of the first internal electrode, and FIG. 4B is a plan view showing an example of the second internal electrode.

As shown in FIG. 4A, the first internal electrode 16 includes a first facing electrode portion 16a facing the second internal electrode 18, a first extended electrode portion 16b extended from the first facing electrode portion 16a to the first end surface 12c of the laminated body 12, and a second extended electrode portion 16c extended from the first facing electrode portion 16a to the second end surface 12d of the laminated body 12. The first extended electrode portion 16b is exposed at the first end surface 12c of the laminated body 12 and connected to the first end surface external electrode 20, and the second extended electrode portion 16c is exposed at the second end surface 12d of the laminated body 12 and connected to the second end surface external electrode 22.

As shown in FIG. 4B, the second internal electrode 18 is substantially cross-shaped, and includes a second facing electrode portion 18a facing the first internal electrode 16, a third extended electrode portion 18b extended from the second facing electrode portion 18a to the first side surface 12e of the laminated body 12, and a fourth extended electrode portion 18c extended from the second facing electrode portion 18a to the second side surface 12f of the laminated body 12. The third extended electrode portion 18b is exposed at the first side surface 12e of the laminated body 12 and connected to the first side surface external electrode 24, and the fourth extended electrode portion 18c is exposed at the second side surface 12f of the laminated body 12 and connected to the second side surface external electrode 26.

The first internal electrode 16 and the second internal electrode 18 face each other with the dielectric layer 14 made of a dielectric ceramic material provided therebetween to define a capacitor. Thus, the multilayer ceramic capacitor 10 defines and functions as a capacitor.

These internal electrodes can be made of an appropriate conductive material. The internal electrode preferably includes, for example, a metal such as Ni, Cu, Ag, Pd, or Au, or an alloy such as an Ag—Pd alloy including one of these metals. The internal electrode may further include dielectric grains of the same or similar composition as the ceramic included in the dielectric layer 14.

The total number of laminated internal electrodes is preferably 5 or more and 2000 or less, for example.

The average thickness of the internal electrode is preferably about 0.3 μm or more and about 30 μm or less, for example.

The ratio at which the internal electrode overlaps the dielectric layer is preferably about 50% or more, more preferably about 80% or more, and still more preferably about 90% or more, for example.

As shown in FIG. 3 and FIGS. 4A and 4B, the laminated body 12 includes a side portion (hereinafter also referred to as "W gap") 14c of the laminated body 12 provided between one end of the first facing electrode portion 16a and the second facing electrode portion 18a in the width direction (W direction), and the first side surface 12e, and between the other end of the first facing electrode portion 16a and the second facing electrode portion 18a in the width direction (W direction), and the second side surface 12f. Furthermore, as shown in FIGS. 2 and 4B, the laminated body 12 includes an end portion (hereinafter also referred to as "L gap") 14d of the laminated body 12 provided between one end of the first facing electrode portion 16a and the second facing electrode portion 18a in the length direction (L direction), and the first end surface 12c, and the other end of the first facing electrode portion 16a and the second facing electrode portion 18a in the length direction (L direction), and the second end surface 12d.

The average length of the W gap 14c in the width direction (W direction) is preferably about 10 μm or more, for example.

The average length of the L gap 14d in the length direction (L direction) is preferably about 10 μm or more, for example.

In the multilayer ceramic capacitor 10, at least one layer of the internal electrode has a bent portion in the extended electrode portion. FIG. 2 shows an example in which the first internal electrodes 16 have respective bent portions in the extended electrode portion, and FIG. 3 shows an example in which the second internal electrodes 18 have respective bent portions in the extended electrode portion.

In the following, the case where the first extended electrode portion 16b of the first internal electrode 16 includes a bent portion will be described as an example. A similar description applies to the case where the second extended electrode portion 16c of the first internal electrode 16, the third extended electrode portion 18b of the second internal electrode 18, and the fourth extended electrode portion 18c of the second internal electrode 18 include respective bent portions.

In the case where the third extended electrode portion 18b of the second internal electrode 18 and the fourth extended electrode portion 18c of the second internal electrode 18 include respective bent portions, the length direction (L direction) only needs to be read as the width direction (W direction).

Figure 5:
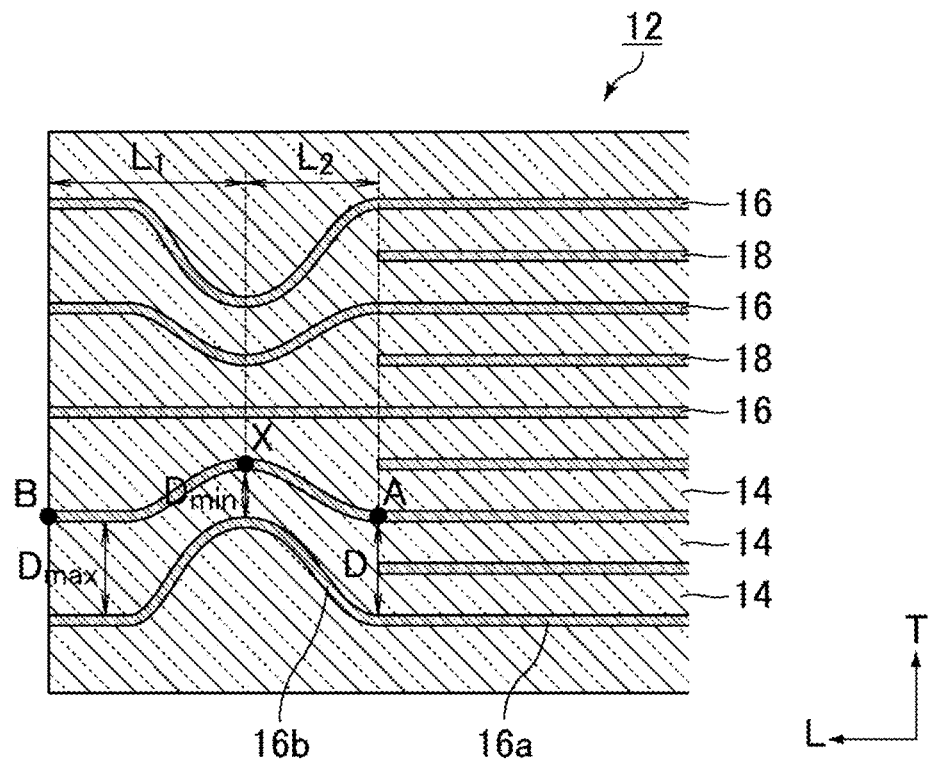
FIG. 5 is a cross-sectional view showing an example of a bent portion.

FIG. 5 is a cross-sectional view showing an example of the bent portion.

In FIG. 5, the first extended electrode portion 16b of the first internal electrode 16 is bent toward the central portion of the laminated body 12 in the lamination direction (T direction). The first extended electrode portion 16b of the first internal electrode 16 located at the central portion of the laminated body 12 in the lamination direction (T direction) may be bent upward or downward in the lamination direction (T direction).

Figure 6:
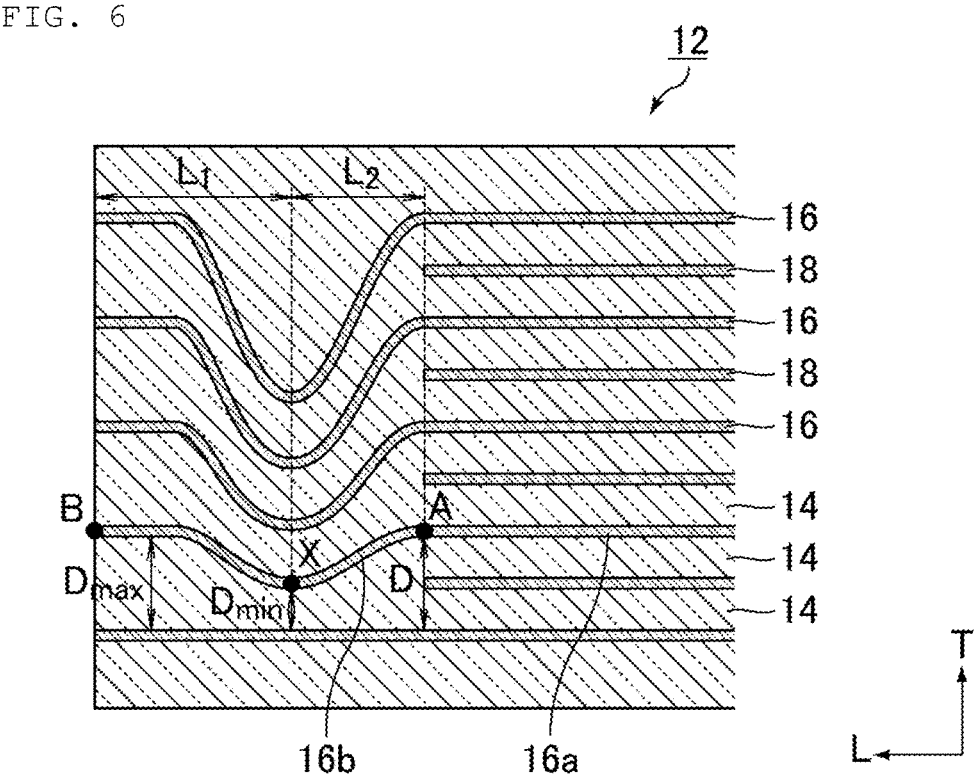
FIG. 6 is a cross-sectional view showing another example of the bent portion.

FIG. 6 is a cross-sectional view showing another example of the bent portion.

In FIG. 6, the first extended electrode portion 16b of the first internal electrode 16 is bent downward in the lamination direction (T direction) of the laminated body 12. The first extended electrode portion 16b of the first internal electrode 16 located at the lowermost portion of the laminated body 12 in the lamination direction (T direction) may be bent downward in the lamination direction (T direction).

Although not shown, the first extended electrode portion 16b of the first internal electrode 16 may be bent upward in the lamination direction (T direction) of the laminated body 12. In this case, the first extended electrode portion 16b of the first internal electrode 16 located at the uppermost portion of the laminated body 12 of the lamination direction (T direction) is bent upward in the lamination direction (T direction).

As described above, at least one layer of the internal electrode includes a bent portion in the extended electrode portion. The bent portion of the extended electrode portion is bent in the lamination direction and has an inflection point (a point indicated by X in FIGS. 5 and 6). The inflection point is a position at which the extended electrode portion is bent most at the bent portion in the lamination direction. As a result, the distance between the extended electrode portions adjacent in the lamination direction (the length indicated by D in FIGS. 5 and 6) narrows from the end portion of the facing electrode portion (location indicated by A in FIGS. 5 and 6) toward the bent portion, and widens from the bent portion toward the end portion of the extended electrode portion on the external electrode side (location indicated by B in FIGS. 5 and 6).

By providing the bent portion in the extended electrode portion of the internal electrode, the distance across which moisture from the outside enters the effective portion is long. As a result, it is difficult for moisture from the outside to reach the effective portion, so that the deterioration of the moisture resistance reliability is able to be significantly reduced or prevented.

Of the laminated internal electrodes, preferably, about 10% or more of the internal electrodes include a bent portion in the extended electrode portion, more preferably, about 40% or more of the internal electrodes include a bent portion in the extended electrode portion, and still more preferably, about 70% or more of the internal electrodes include a bent portion in the extended electrode portion, for example. In particular, preferably 100% of the internal electrodes, that is, all of the laminated internal electrodes include a bent portion in the extended electrode portion, for example.

As shown in FIG. 2 and FIG. 3, preferably, all of the first extended electrode portion 16b of the first internal electrodes 16, the second extended electrode portion 16c of the first internal electrodes 16, the third extended electrode portion 18b of the second internal electrodes 18, and the fourth extended electrode portion 18c of the second internal electrode 18 include a bent portion, but there may be an extended electrode portion that does not include a bent portion, for example.

In FIG. 2, the position of the inflection point of the bent portion in the length direction (L direction) is the same or substantially the same for all internal electrodes including the bent portion, but respective internal electrodes may have different positions. Similarly, in FIG. 3, the position of the inflection point of the bent portion in the width direction (W direction) is the same or substantially the same for all internal electrodes including the bent portion, but respective internal electrodes may have different positions.

As shown in FIG. 5 and FIG. 6, when the minimum distance between the end portion A of the facing electrode portion and the bent portion is represented by $D_{min}$, and the maximum distance between the bent portion and the end portion B of the extended electrode portion on the external electrode side is represented by $D_{max}$ of the distance between the extended electrode portions adjacent in the lamination direction (T direction), the value of $D_{max}/D_{min}$ is preferably about 1.3 or more, for example. The upper limit is not particularly limited, but the value of $D_{max}/D_{min}$ is preferably about 3 or less, for example.

By setting the value of $D_{max}/D_{min}$ to about 1.3 or more, it is difficult for moisture from the outside to reach the effective portion, and therefore it is possible to further significantly reduce or prevent the deterioration of the moisture resistance reliability.

The values of $D_{max}/D_{min}$ are compared by the distance between the layers where the same layers are used when measuring $D_{max}$ and $D_{min}$.

Further, as described above, internal electrodes may respectively have different positions of the inflection point X of the bent portion.

Therefore, the position of $D_{min}$ is not necessarily the same as the position of the inflection point X.

In the length direction (L direction) or the width direction (W direction), the distance from the end portion B of the extended electrode portion on the external electrode side to the inflection point X of the bent portion (length indicated by $L_1$ in FIGS. 5 and 6) is preferably about 5 μm or more, for example. The upper limit value is not particularly limited, but the distance from the end portion B of the extended electrode portion on the external electrode side to the inflection point X of the bent portion is preferably about 100 μm or less, for example.

In the length direction (L direction) or the width direction (W direction), the distance from the end portion A of the facing electrode portion to the inflection point X of the bent portion (length indicated by $L_2$ in FIGS. 5 and 6) is preferably about 5 μm or more, for example. The upper limit is not particularly limited, but the distance from the end portion A of the facing electrode portion to the inflection point X of the bent portion is preferably about 100 μm or less, for example.

The length of $L_2$ is measured between adjacent internal electrodes.

The ratio of $L_1$ to the total length of $L_1$ and $L_2$ is preferably about 5% or more and about 95% or less, and the ratio of $L_2$ to the total length of $L_1$ and $L_2$ is preferably about 5% or more and about 95% or less, for example.

In addition, preferably, no dummy electrode is connected to the same external electrode as the extended electrode portion and not substantially contributing to capacitance formation, and no floating electrode not connected to the external electrode between the extended electrode portions adjacent in the lamination direction, for example.

The dimension of the multilayer ceramic capacitor 10 in the length direction (L direction) is preferably about 0.2 mm or more and about 6.9 mm or less, for example. The dimension of the multilayer ceramic capacitor 10 in the width direction (W direction) is preferably about 0.2 mm or more and about 3.7 mm or less, for example. The dimension of the multilayer ceramic capacitor 10 in the lamination direction (T direction) is preferably about 0.05 mm or more and about 3.7 mm or less, for example.

A preferred embodiment of a method of manufacturing a multilayer ceramic capacitor according to the present invention is described below.

The method of manufacturing the multilayer ceramic capacitor preferably includes forming an internal electrode pattern on a ceramic green sheet, applying a ceramic paste without overlapping a peripheral edge of the internal electrode pattern on the ceramic green sheet around the internal electrode pattern, forming a ceramic paste layer that reduces a step due to a thickness of the internal electrode pattern, and laminating the ceramic green sheets on which the internal electrode pattern and the ceramic paste layer are formed, for example.

Hereinafter, mass production of the multilayer ceramic capacitor 10 shown in FIG. 1 will be described as an example.

First, a ceramic green sheet that defines the dielectric layer 14 is prepared. Separately, an internal electrode conductive paste that forms the first internal electrode 16 and the second internal electrode 18, and an external electrode conductive paste that forms the first end surface external electrode 20, the second end surface external electrode 22, the first side surface external electrode 24, and the second side surface external electrode 26 are prepared. The ceramic green sheet, the internal electrode conductive paste, and the external electrode conductive paste include an organic binder and a solvent, and known organic binders and organic solvents can be used.

For example, the internal electrode conductive paste is applied in a predetermined pattern to the ceramic green sheet to form the internal electrode pattern. At this time, a step is formed by the thickness of the applied internal electrode conductive paste. In addition, the internal electrode conductive paste can be applied by a well-known method, for example, a screen-printing method.

Figure 7A:
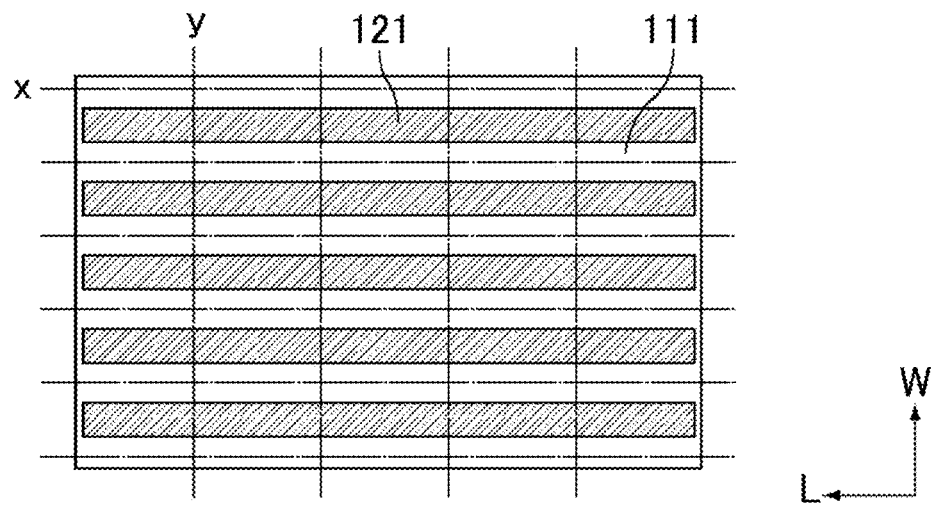
FIGS. 7A and 7B are plan views showing an example of a ceramic green sheet on which an internal electrode pattern is provided.
Figure 7B:
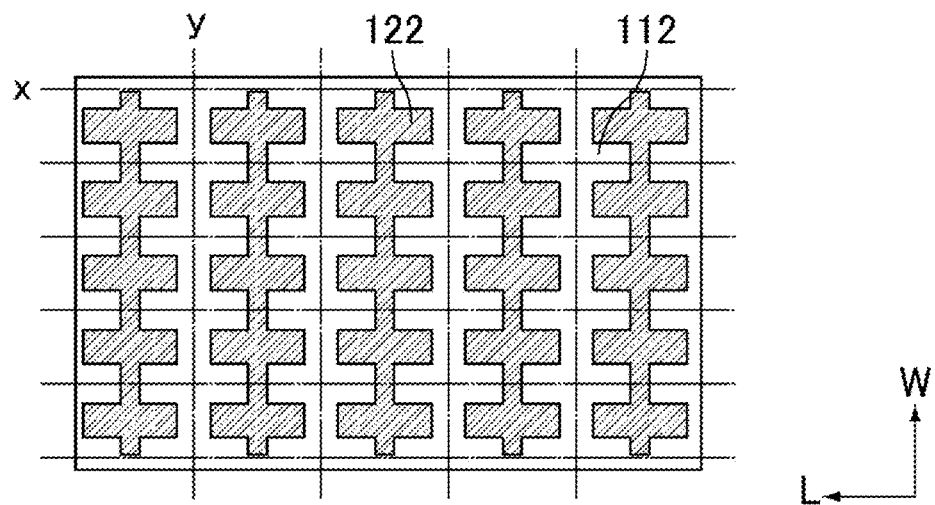

FIGS. 7A and 7B are plan views showing an example of a ceramic green sheet on which the internal electrode pattern is formed.

An internal electrode pattern 121 to be the first internal electrode 16 is formed on a ceramic green sheet 111 shown in FIG. 7A, and an internal electrode pattern 122 to be the second internal electrode 18 is formed on a ceramic green sheet 112 shown in FIG. 7B.

In FIGS. 7A and 7B, the ceramic green sheets 111 and 112 are not separated for each multilayer ceramic capacitor 10. FIGS. 7A and 7B show cutting lines x and y at the time of dividing the ceramic green sheets 111 and 112 for each multilayer ceramic capacitor 10. The cutting line x is parallel or substantially parallel to the length direction (L direction), and the cutting line y is parallel or substantially parallel to the width direction (W direction).

In the internal electrode pattern 121, the plurality of first internal electrodes 16 are coupled in the length direction (L direction), and are aligned along the width direction (W direction). On the other hand, in the internal electrode pattern 122, the plurality of second internal electrodes 18 are coupled in the width direction (W direction) and are aligned along the length direction (L direction).

Next, a ceramic paste is applied to the ceramic green sheet around the internal electrode pattern without overlapping the peripheral edge of the internal electrode pattern to form a ceramic paste layer in order to reduce the step due to the thickness of the internal electrode pattern. The ceramic paste can be applied by a known method, for example, a screen-printing method.

Figure 8A:
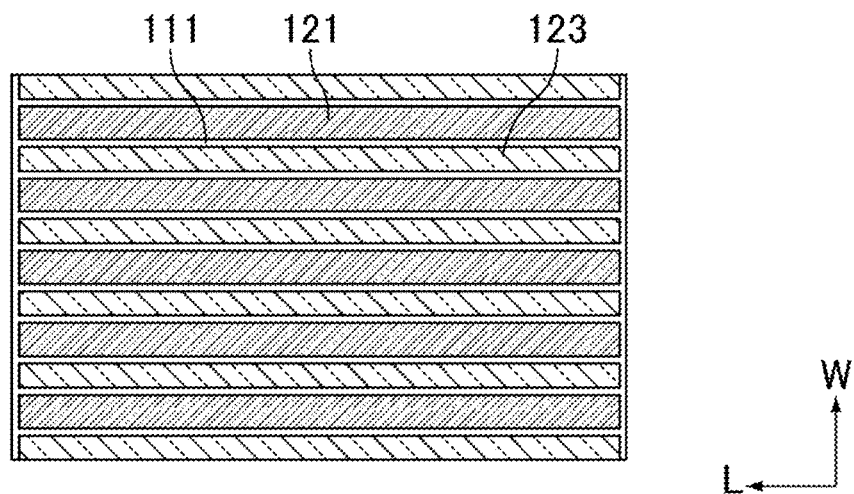
FIGS. 8A and 8B are plan views showing an example of a ceramic green sheet in which a ceramic paste layer is provided around an internal electrode pattern.
Figure 8B:
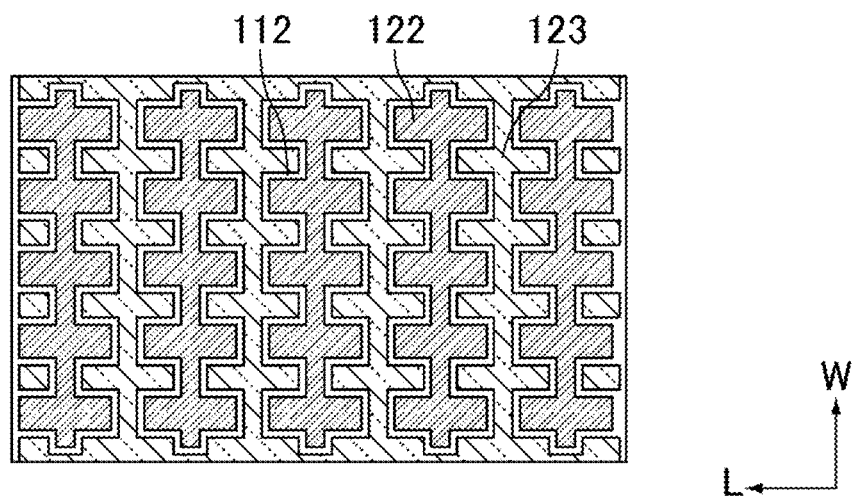

FIGS. 8A and 8B are plan views showing an example of a ceramic green sheet in which a ceramic paste layer is formed around an internal electrode pattern.

A ceramic paste layer 123 is formed around the internal electrode pattern 121 on the ceramic green sheet 111 shown in FIG. 8A, and the ceramic paste layer 123 is formed around the internal electrode pattern 122 on the ceramic green sheet 112 shown in FIG. 8B.

As shown in FIGS. 8A and 8B, the ceramic paste layer 123 that reduces the step is formed without overlapping the peripheral edge of the internal electrode pattern 121 or 122. In other words, the ceramic paste layer 123 that reduces the step is formed with a gap from the internal electrode pattern 121 or 122. Thus, when the ceramic green sheets 111 and 112 are laminated, a bent portion is formed in the extended electrode portion of the internal electrode.

By changing the gap between the ceramic paste layer and the internal electrode pattern or changing the ratio of the thickness of the ceramic paste layer to the thickness of the internal electrode pattern, the shape of the bent portion formed in the extended electrode portion of the internal electrode can be adjusted.

In addition, the order of the process of forming an internal electrode pattern and the process of forming a ceramic paste layer is not specifically limited. The internal electrode pattern may be formed after the ceramic paste layer is formed.

Subsequently, a predetermined number of outer layer ceramic green sheets on which the internal electrode pattern and the ceramic paste layer are not formed are laminated, on top of that, ceramic green sheets on which internal electrode patterns and ceramic paste layers are formed are sequentially laminated, on top of that, a predetermined number of outer layer ceramic green sheets are laminated, and a mother laminated body is produced. The mother laminated body may be bonded in the lamination direction by a isostatic press or the like.

Thereafter, the mother laminated body is cut along the cutting lines x and y, and the unfired laminated body 12 is cut out. At this time, corner portions and ridgeline portions of the laminated body may be rounded by barrel polishing or the like.

The unfired laminated body 12 is fired. As a result, the laminated body 12 in which the first internal electrodes 16 and the second internal electrodes 18 are provided is produced. The firing temperature can be appropriately set depending on the used ceramic material and conductive material, and is preferably, for example, about 900° C. or more and about 1300° C. or less. The ceramic green sheet, the internal electrode conductive paste, and the ceramic paste are simultaneously fired.

The conductive paste is applied to the first end surface 12*c* of the obtained laminated body 12 and fired to form the base electrode layer 28 of the first end surface external electrode 20. The conductive paste is applied to the second end surface 12*d* and fired to form the base electrode layer 32 of the second end surface external electrode 22. In addition, the conductive paste is applied to the first side surface 12*e* of the laminated body 12 and fired to form the base electrode layer 36 of the first side surface external electrode 24. The conductive paste is applied to the second side surface 12*f* and fired to form the base electrode layer 40 of the second side surface external electrode 26. The baking temperature is preferably about 700° C. or more and about 900° C. or less, for example.

The plating layer 30 is formed on the surface of the base electrode layer 28 of the first end surface external electrode 20, and the plating layer 34 is formed on the surface of the base electrode layer 32 of the second end surface external electrode 22. Also, the plating layer 38 is formed on the surface of the base electrode layer 36 of the first side surface external electrode 24, and the plating layer 42 is formed on the surface of the base electrode layer 40 of the second side surface external electrode 26.

As described above, the multilayer ceramic capacitor 10 shown in FIG. 1 is manufactured.

Examples

Examples of multilayer ceramic capacitors according to preferred embodiments of the present invention are described below. The present invention is not limited to only the following examples of preferred embodiments of the present invention.

In the following examples, a three-terminal capacitor is used, but, for example, a two-terminal capacitor may be used.

The multilayer ceramic capacitor used in this examples has a structure in which the first internal electrodes 16 as shown in FIG. 4A and the second internal electrodes 18 as shown in FIG. 4B are alternately laminated, and the extended electrode portion of each internal electrode is connected to an external electrode formed on the surface of the laminated body. The dimensions of the multilayer ceramic capacitor are about 1.0 mm in length, about 0.5 mm in width, and about 0.5 mm in thickness.

The above-described multilayer ceramic capacitor is manufactured by the method described above.

First, a ceramic green sheet including barium titanate as a main component, an internal electrode conductive paste, and a ceramic paste including barium titanate as a main component were prepared.

An Ni conductive paste was applied by screen printing to a ceramic green sheet having a thickness of about 0.9 μm formed by a doctor blade method to form an internal electrode pattern in a matrix. In the present examples, an internal electrode pattern having a thickness of about 0.9 μm was formed.

In Examples 1 to 6, a ceramic paste was applied to the ceramic green sheet around the internal electrode pattern without overlapping the peripheral edge of the internal electrode pattern to form a ceramic paste layer in order to reduce the step due to the thickness of the internal electrode pattern.

At this time, the average thickness of the ceramic paste was changed in the range of about 0.2 times to about 2 times the thickness of the internal electrode pattern.

Further, the gap between the peripheral edge of the internal electrode pattern and the ceramic paste was changed in the range of about 5 μm to about 30 μm. Furthermore, the average lengths of the L gap and the W gap after firing were changed in the range of about 7 μm to about 50 μm.

Separately, Comparative Example 1 in which the ceramic paste was not applied was prepared. In the Examples and Comparative Example, the L gap and the W gap have the same or substantially the same dimensions.

A predetermined number of ceramic green sheets (500 layers in this example) on which internal electrode patterns and ceramic paste layers are formed are laminated, a predetermined number of outer layer ceramic green sheets on which internal electrode patterns and ceramic paste layers are not formed are laminated on the both upper and lower main surfaces side, and then they are bonded with rubber to produce a mother laminated body.

The obtained mother laminated body was cut at a predetermined position to be divided into an unfired laminated body.

Thereafter, the unfired laminated body is fired, and an external electrode is formed on the obtained sintered body to produce a multilayer ceramic capacitor.

The external electrode was formed by applying a glass-containing Cu paste and baking, and then applying Ni plating and Sn plating.

When the LT cross section and the WT cross section of the multilayer ceramic capacitors of Examples 1 to 6 were observed, it was discovered that the extended electrode portion of the internal electrode included the bent portion in which the distance between the extended electrode portions adjacent to each other in the lamination direction was narrowed from the end portion of the facing electrode portion toward the end portion of the extended electrode portion on the external electrode side, and was widened again. On the other hand, when the LT cross section and WT cross section of the multilayer ceramic capacitor of Comparative Example 1 were observed, it was not found that the extended electrode portion of the internal electrode included the bent portion in which the distance between the extended electrode portions adjacent to each other in the lamination direction was narrowed from the end portion of the facing electrode portion toward the end portion of the extended electrode portion on the external electrode side, and was widened again.

In the multilayer ceramic capacitors of Examples 1 to 6, the minimum distance $D_{min}$ between the end portion of the facing electrode portion and the bent portion, the maximum distance $D_{max}$ between the bent portion and the end portion of the extended electrode portion on the external electrode side, the distance $L_1$ from the end portion of the extended electrode portion on the external electrode side to the inflection point of the bent portion, and the distance $L_2$ from the end portion of the facing electrode portion to the inflection point of the bent portion were measured. The results are shown in Table 1.

Figure 9:
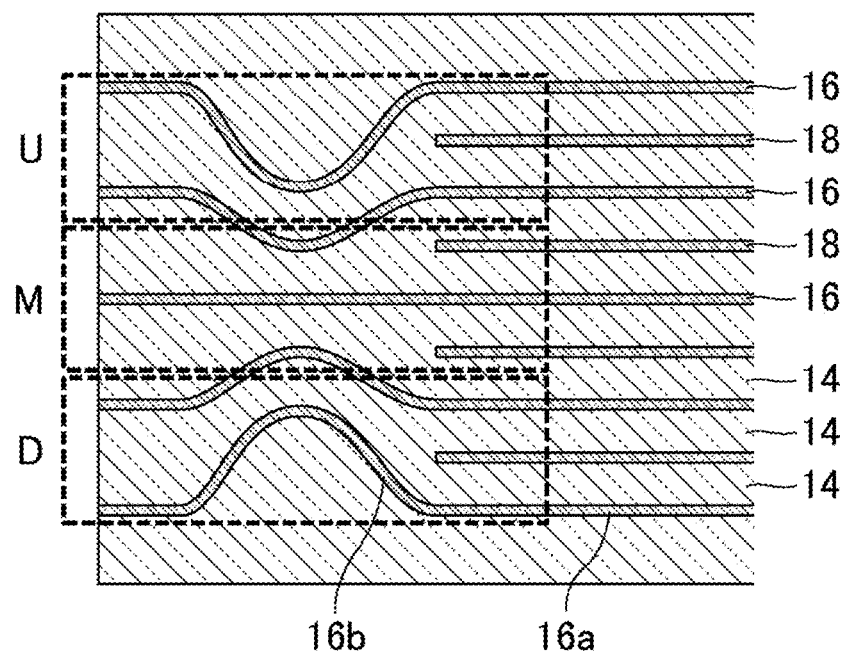
FIG. 9 is a cross-sectional view showing a method of measuring each dimension.

FIG. 9 is a cross-sectional view showing a method of measuring each dimension.

FIG. 9 shows an upper portion U, a middle portion M, and a lower portion D obtained by equally or substantially equally dividing a region where the internal electrodes are laminated into three. FIG. 9 shows each region, and actually, more internal electrodes exist in each region.

$D_{min}$ and $D_{max}$ Measurement Method

Three multilayer ceramic capacitors are prepared for each Example.

As shown in FIG. 9, the region where the internal electrodes are laminated is equally or substantially equally divided into three of the upper portion U, the middle portion M, and the lower portion D, and various dimensions are measured at five locations near the center of each portion in the T direction to obtain an average value.

As a result, 180 locations (=three chips×four extended electrode portions×three regions of the upper portion U, the middle portion M, and the lower portion D×5 locations) are measured to determine the average value.

Method of Measuring $L_1$ and $L_2$

Three multilayer ceramic capacitors are prepared for each Example.

The first and second extended electrode portions are measured on the LT cross section at a position of about ½ of the length of the W direction.

The third and fourth extended electrode portions are measured on the WT cross section at a position of about ½ of the length of the L direction.

Each cross section is observed using a field emission scanning electron microscope (FE-SEM).

In the region where the internal electrodes are laminated, various dimensions are measured for the five outermost extended electrode portions in the upper portion U, the five outermost extended electrode portions in the lower portion D, and the five extended electrode portions in the middle portion M to determine the minimum value.

As a result, 180 locations (=three chips×four extended electrode portions×three regions of the upper portion U, the middle portion M, and the lower portion D×5 locations) are measured to determine the minimum value.

The moisture resistance reliability and the high temperature reliability of the multilayer ceramic capacitors of Examples 1 to 6 and Comparative Example 1 were evaluated. The results are shown in Table 1.

Moisture Resistance Reliability

The insulation resistance IR (Ω) after about 250 hours was measured under the conditions of a temperature of about 40° C., a humidity of about 90% RH, an applied voltage of 4V, and 10 samples. The chip in which log IR≤6 was counted as NG (defect).

High Temperature Reliability

The insulation resistance IR (Ω) after about 250 hours was measured under the conditions of a temperature of about 85° C., an applied voltage of about 4V, and 10 samples. The chip in which log IR≤6 was counted as NG (defect).

TABLE 1

|  | Comparative Example 1 | Example 1 | Example 2 | Example 3 | Example 4 | Example 5 | Example 6 |
| --- | --- | --- | --- | --- | --- | --- | --- |
| $D_{max}/D_{min}$ (average value) [μm] | — | 1.1 | 1.3 | 2 | 2 | 2 | 2 |
| $L_1$ (minimum value) [μm] | — | 40 | 40 | 40 | 5 | 5 | 2 |
| $L_2$ (minimum value) [μm] | — | 10 | 10 | 10 | 5 | 2 | 5 |
| Moisture resistance reliability | 3/10 | 1/10 | 0/10 | 0/10 | 0/10 | 0/10 | 1/10 |
| High temperature reliability | 0/10 | 0/10 | 0/10 | 0/10 | 0/10 | 3/10 | 0/10 |

The first and second extended electrode portions are measured on the LT cross section at a position of about ½ of the length of the W direction.

The third and fourth extended electrode portions are measured on the WT cross section at a position of about ½ of the length of the L direction.

Each cross section is observed using a field emission scanning electron microscope (FE-SEM).

From Table 1, Examples 1 to 6 in which the bent portion is provided in the extended electrode portion of the internal electrode have reduced deterioration of the moisture resistance reliability, compared with Comparative Example 1 in which the bent portion is not provided. In particular, when the value of $D_{max}/D_{min}$ is about 1.3 or more, the deterioration of the moisture resistance reliability is not recognized.

From the above results, it was discovered that the deterioration of the moisture resistance reliability is able to be significantly reduced or prevented by providing the bent portion in the extended electrode portion of the internal electrode.

In Comparative Example 1, it is presumed that the insulation resistance IR is deteriorated by the moisture entering from the extended electrode portion and reaching the effective portion.

On the other hand, in Examples 1 to 6, it is presumed that the moisture is difficult to reach the effective portion because the distance to the effective portion is increased by the bent portion. In addition, it is conceivable that the moisture is less likely to enter the effective portion due to the reduction of the fine pores in the boundary between the ceramic portion and the electrode portion in the extended electrode portion and the fine pores in the electrode portion.

From the comparison of Examples 4 and 6, when the distance $L_1$ from the end portion of the extended electrode portion on the external electrode side to the inflection point of the bent portion is about 5 μm or more, the deterioration of the moisture resistance reliability is further significantly reduced or prevented.

It is conceivable that the moisture is less likely to enter the effective portion by providing a distance due to that the fine pores in the boundary between the ceramic portion and the electrode portion and the fine pores in the electrode portion are reduced.

From the comparison of Examples 5 and 6, when the distance $L_2$ from the end portion of the facing electrode portion to the inflection point of the bent portion is about 5 μm or more, the deterioration of the high temperature reliability is significantly reduced or prevented.

It is presumed that this is because the reduction in thickness of the effective portion is significantly reduced or prevented by securing the distance from the end portion of the facing electrode portion to the inflection point of the bent portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminated body including a plurality of dielectric layers and a plurality of internal electrodes that are alternately laminated, and including a first main surface and a second main surface facing each other in a lamination direction, a first end surface and a second end surface facing each other in a length direction orthogonal or substantially orthogonal to the lamination direction, and a first side surface and a second side surface facing each other in a width direction orthogonal or substantially orthogonal to the lamination direction and the length direction; and
a first external electrode provided on a surface of the laminated body and connected to first internal electrodes of the plurality of internal electrodes; wherein
each of the first internal electrodes includes:
a first facing electrode portion facing another one of the plurality of internal electrodes with the plurality of dielectric layers provided therebetween; and
a first extended electrode portion extended from the first facing electrode portion to the surface of the laminated body and connected to the first external electrode;
at least one of the first internal electrodes includes a first bent portion at the first extended electrode portion; and
a distance between first extended electrode portions adjacent to each other in the lamination direction narrows from an end portion of the first facing electrode portion toward the first bent portion, and widens from the first bent portion toward an end portion of the first extended electrode portion on a side of the first external electrode.

2. The multilayer ceramic capacitor according to claim 1, wherein when a minimum distance between the end portion of the first facing electrode portion and the first bent portion is represented by $D_{min}$, and a maximum distance between the first bent portion and the end portion of the first extended electrode portion on the side of the first external electrode is represented by $D_{max}$ with respect to the distance between the first extended electrode portions adjacent to each other in the lamination direction, a value of $D_{max}/D_{min}$ is about 1.3 or more.

3. The multilayer ceramic capacitor according to claim 1, wherein a distance from the end portion of the first extended electrode portion on the side of the first external electrode to an inflection point of the first bent portion in the length direction or the width direction is about 5 μm or more.

4. The multilayer ceramic capacitor according to claim 1, wherein a distance from the end portion of the first facing electrode portion to an inflection point of the first bent portion in the length direction or the width direction is about 5 μm or more.

5. The multilayer ceramic capacitor according to claim 1, wherein each of the plurality of dielectric layers is made of a dielectric material that includes a dielectric ceramic.

6. The multilayer ceramic capacitor according to claim 1, wherein an average thickness of each of the plurality of dielectric layers is about 0.3 μm or more and about 30 μm or less.

7. The multilayer ceramic capacitor according to claim 1, wherein
the plurality of dielectric layers include a first outer layer portion, a second outer layer portion, and an inner layer portion;
the first outer layer portion includes a dielectric layer of the plurality of dielectric layers located between the first main surface and an internal electrode of the plurality of internal electrodes located closest to the first main surface;
the second outer layer portion includes a dielectric layer of the plurality of dielectric layers located between the second main surface and an internal electrode of the plurality of internal electrodes located closest to the second main surface;
the inner layer portion is located between the first outer layer portion and the second outer layer portion; and
a thickness of each of the first outer layer portion and the second outer layer portion is about 5 μm or more and about 100 μm or less on one side.

8. The multilayer ceramic capacitor according to claim 1, wherein
a dimension of the laminated body in the length direction is about 0.15 mm or more and about 6.4 mm or less;
a dimension of the laminated body in the width direction is about 0.15 mm or more and about 3.2 mm or less; and
a dimension of the laminated body in the lamination direction is about 0.04 mm or more and about 3.2 mm or less.

9. The multilayer ceramic capacitor according to claim 1, wherein the first external electrode is provided on the first end surface of the laminated body; and a second external electrode is provided on the second end surface of the laminated body.

10. The multilayer ceramic capacitor according to claim 9, wherein a third external electrode is provided on the first side surface of the laminated body.

11. The multilayer ceramic capacitor according to claim 10, wherein a fourth external electrode is provided on the second side surface of the laminated body.

12. The multilayer ceramic capacitor according to claim 10, wherein the third external electrode includes a base electrode layer provided on the first side surface of the laminated body and a plating layer that at least partially covers the base electrode layer.

13. The multilayer ceramic capacitor according to claim 9, wherein the second external electrode is connected to second internal electrodes of the plurality of internal electrodes;

each of the second internal electrodes includes:

a second facing electrode portion facing another one of the plurality of internal electrodes with at least one of the plurality of dielectric layers provided therebetween; and a second extended electrode portion extended from the second facing electrode portion to the surface of the laminated body and connected to the second external electrode.

14. The multilayer ceramic capacitor according to claim 13, wherein at least one of the second internal electrodes includes a second bent portion at the second extended electrode portion.

15. The multilayer ceramic capacitor according to claim 14, wherein the first bent portion is only bent downward in the lamination direction.

16. The multilayer ceramic capacitor according to claim 1, wherein the first external electrode includes a base electrode layer provided on the first end surface of the laminated body and a plating layer that at least partially covers the base electrode layer.

17. The multilayer ceramic capacitor according to claim 1, wherein the first bent portion is bent toward a central portion of the laminated body in the lamination direction.

* * * * *